(12) United States Patent
Lee et al.

(10) Patent No.: US 9,563,113 B2
(45) Date of Patent: Feb. 7, 2017

(54) MULTI-PROJECTION SYSTEM USING A SINGLE ILLUMINATION SOURCE AND A SINGLE IMAGING DEVICE

(71) Applicant: Young Optics Inc., Hsinchu County (TW)

(72) Inventors: Kuei-Yu Lee, Hsinchu County (TW); Chao-Shun Chen, Hsinchu County (TW); Haw-Woei Pan, Hsinchu County (TW)

(73) Assignee: YOUNG OPTICS INC., Hsinchu County (TW)

( * ) Notice: Subject to any disclaimer, the term of this patent is extended or adjusted under 35 U.S.C. 154(b) by 325 days.

(21) Appl. No.: 13/662,590

(22) Filed: Oct. 29, 2012

(65) Prior Publication Data

US 2014/0118701 A1    May 1, 2014

(51) Int. Cl.

| | |
|---|---|
| *G03B 21/14* | (2006.01) |
| *G03B 21/28* | (2006.01) |
| *H04N 9/31* | (2006.01) |
| *G03B 21/00* | (2006.01) |
| *G03B 37/04* | (2006.01) |
| *G03B 21/26* | (2006.01) |

(52) U.S. Cl.
CPC ............. *G03B 21/28* (2013.01); *G03B 21/008* (2013.01); *G03B 37/04* (2013.01); *H04N 9/3147* (2013.01); *G03B 21/14* (2013.01); *G03B 21/26* (2013.01)

(58) Field of Classification Search
CPC ....... G03B 21/008; G03B 21/26; G03B 21/14; G03B 21/28; H04N 9/3147

USPC ...................................................... 353/82, 94
See application file for complete search history.

(56) References Cited

U.S. PATENT DOCUMENTS

| | | | | |
|---|---|---|---|---|
| 5,548,348 | A | * | 8/1996 | Kawabata ............ H04N 5/7441 348/756 |
| 6,886,943 | B1 | * | 5/2005 | Greenberg et al. ............. 353/94 |
| 8,322,864 | B2 | | 12/2012 | Maes |
| 8,408,720 | B2 | * | 4/2013 | Nishigaki et al. .............. 353/94 |
| 8,439,508 | B2 | * | 5/2013 | Matsuo et al. ................ 353/119 |
| 8,752,965 | B2 | * | 6/2014 | Huang ............................. 353/8 |
| 2007/0008503 | A1 | * | 1/2007 | Choi ............................. 353/98 |
| 2007/0177275 | A1 | * | 8/2007 | McGuire, Jr. ................ 359/630 |
| 2008/0074625 | A1 | * | 3/2008 | Lai et al. ........................ 353/82 |
| 2011/0134398 | A1 | * | 6/2011 | Hsu ........................ G03B 21/14 353/81 |
| 2012/0206697 | A1 | * | 8/2012 | Lee ................................ 353/82 |
| 2013/0100527 | A1 | * | 4/2013 | Chung et al. ................. 359/449 |
| 2014/0092366 | A1 | * | 4/2014 | Chen et al. ..................... 353/20 |

\* cited by examiner

*Primary Examiner* — Bao-Luan Le
(74) *Attorney, Agent, or Firm* — Muncy, Geissler, Olds & Lowe, P.C.

(57) ABSTRACT

A projection apparatus for projecting a first image and a second image is disclosed. The projection apparatus has a casing, a light source module providing an illumination beam, a light valve device, a first prism, a second prism, a third prism, a fourth prism, a first projection lens, and a second projection lens. The illumination beam enters the first prism, the second prism, the third prism, the fourth prism, and the light valve device. The illumination beam is reflected and converted into a first image beam and a second image beam. The first image beam enters the first prism and is totally reflected to the first projection lens to form the first image. The second image beam enters the third prism and is totally reflected to the second projection lens to form the second image.

19 Claims, 7 Drawing Sheets

MULTI-PROJECTION SYSTEM USING A SINGLE ILLUMINATION SOURCE AND A SINGLE IMAGING DEVICE

BACKGROUND OF THE INVENTION

1. Field of the Invention

The present invention relates to a projection apparatus; more particularly, the present invention relates to a projection apparatus capable of projecting a first image and a second image.

2. Description of the Related Art

Most commonly used projection apparatuses are designed to project only one image because one projection apparatus is equipped with a single digital micro-mirror device (DMD). If two images need to be projected, two projection apparatuses can be used, or splitters can be employed to project two images. However, due to the divergence of light, if the splitter is far from the light source, a larger splitter is needed, and the volume of the projection apparatus will be correspondingly increased. Furthermore, from the manufacturer's perspective, producing a projection apparatus with two DMDs in one projection apparatus is not economical because the DMD, a key element of a projection apparatus, is quite expensive.

Therefore, there is a need to provide a new projection apparatus capable of projecting two images with only a single DMD to solve the problem of the prior art.

SUMMARY OF THE INVENTION

An object of the present invention is to provide a projection apparatus capable of projecting a first image and a second image.

To achieve the abovementioned object, the projection apparatus capable of projecting a first image and a second image comprises a casing, a light source module, a light valve device, a first prism, a second prism, a third prism, a fourth prism, a first projection lens, and a second projection lens.

The light source module is disposed in the casing and provides an illumination beam. The light valve device is disposed in the casing and located on a transmission path of the illumination beam. The light valve device comprises a plurality of light valve units. The light valve device can be divided into at least a first zone and a second zone. The plurality of light valve units is located on the first zone and the second zone.

The first prism is disposed in the casing, between the light source module and the light valve device, and is located above the first zone. The second prism is disposed in the casing, between the light source module and the light valve device, and is located above the first prism and the first zone.

The transmission path of the illumination beam incident to the first zone of the light valve device is thus: The illumination beam enters the second prism, the first prism, and the first zone. Then the plurality of light valve units located in the first zone reflect and convert the illumination beam into a first image beam. The first image beam enters the first prism, and then the first prism totally reflects the first image beam to the first projection lens for allowing the first projection lens to project the first image beam to form the first image. Furthermore, the first projection lens is disposed in the casing and is located on the transmission path of the first image beam.

The third prism is disposed in the casing, between the light source module and the light valve device, and is located above the second zone. The fourth prism is disposed in the casing, between the light source module and the light valve device, and is located above the third prism and the second zone.

The transmission path of the illumination beam incident to the second zone of the light valve device is thus: The illumination beam enters the fourth prism, the third prism, and the second zone. Then the plurality of light valve units located in the second zone reflect and convert the illumination beam into a second image beam. The second image beam enters the third prism, and then the third prism totally reflects the second image beam to the second projection lens for allowing the second projection lens to project the second image beam to form the second image. Furthermore, the second projection lens is disposed in the casing and is located on the transmission path of the second image beam.

According to one embodiment of the present invention, the first prism comprises a first surface, a second surface, and a third surface. The second prism comprises a fourth surface, a fifth surface, and a sixth surface, wherein the fourth surface connects to the first surface.

The transmission path of the illumination beam incident to the first zone of the light valve device is thus: The illumination beam enters the fifth surface, the fourth surface, the first surface, and the second surface. The plurality of light valve units in the first zone reflect and convert the illumination beam into the first image beam. The first image beam enters the second surface and is totally reflected by the first surface and then outputted to the first projection lens via the third surface.

The third prism comprises a seventh surface, an eighth surface, and a ninth surface, wherein the eighth surface is disposed above the second zone. The fourth prism comprises a tenth surface, an eleventh surface, and a twelfth surface, wherein the tenth surface connects to the seventh surface.

The transmission path of the illumination beam incident to the second zone of the light valve device is thus: The illumination beam enters the eleventh surface, the tenth surface, the seventh surface, and the eighth surface. The plurality of light valve units in the second zone reflect and convert the second image beam into the second image beam; the second image beam enters the eighth surface and is totally reflected by the seventh surface and then outputted to the second projection lens via the ninth surface.

According to one embodiment of the present invention, a first angle $\theta_1$ is formed by the first surface and the second surface. A second angle $\theta_2$ is formed by the first surface and the third surface. A third angle $\theta_3$ is formed by the fourth surface and the fifth surface. A fourth angle $\theta_4$ is formed by the fifth surface and the sixth surface. A fifth angle $\theta_5$ is formed by the seventh surface and the eighth surface. A sixth angle $\theta_6$ is formed by the seventh surface and the ninth surface. A seventh angle $\theta_7$ is formed by the tenth surface and the eleventh surface. An eighth angle $\theta_8$ is formed by the eleventh surface and the twelfth surface. Furthermore, $30° \leq$ the first angle $\theta_1 \leq 60°$.

According to one embodiment of the present invention, $30° \leq$ the second angle $\theta_2 \leq 60°$; $30° \leq$ the third angle $\theta_3 \leq 60°$; $30° \leq$ the fourth angle $\theta_4 \leq 60°$; $30° \leq$ the fifth angle $\theta_5$ is $\leq 60°$; $30° \leq$ the sixth angle $\theta_6 \leq 60°$; $30° \leq$ the seventh angle $\theta_7 \leq 60°$; $30° \leq$ the eighth angle $\theta_8 \leq 60°$.

According to one embodiment of the present invention, a tilting angle for activating the light valve unit located in the first zone to an on state is reversed to the tilting angle for activating the light valve unit located in the second zone.

According to one embodiment of the present invention, the light valve device further comprises a third zone disposed between the first zone and the second zone.

According to one embodiment of the present invention, the light valve unit located in the third zone is set in an off state.

According to one embodiment of the present invention, the projection apparatus further comprises a first reflecting mirror and a second reflecting mirror. The first reflecting mirror projects the first image beam to form the first image after the first image beam passes through the first projection lens. The second reflecting mirror projects the second image beam to form the second image after the second image beam passes through the second projection lens.

According to one embodiment of the present invention, an index of refraction of the second prism and the index of refraction of the first prism are the same; the index of refraction of the third prism and the index of refraction of the fourth prism are the same.

DETAILED DESCRIPTION OF THE PREFERRED EMBODIMENT

The exemplary embodiments of the present invention will be understood more fully from the detailed description given below and from the accompanying drawings of various embodiments of the invention, which, however, should not be taken to limit the invention to the specific embodiments, but are for explanation and understanding only.

Figure 1:
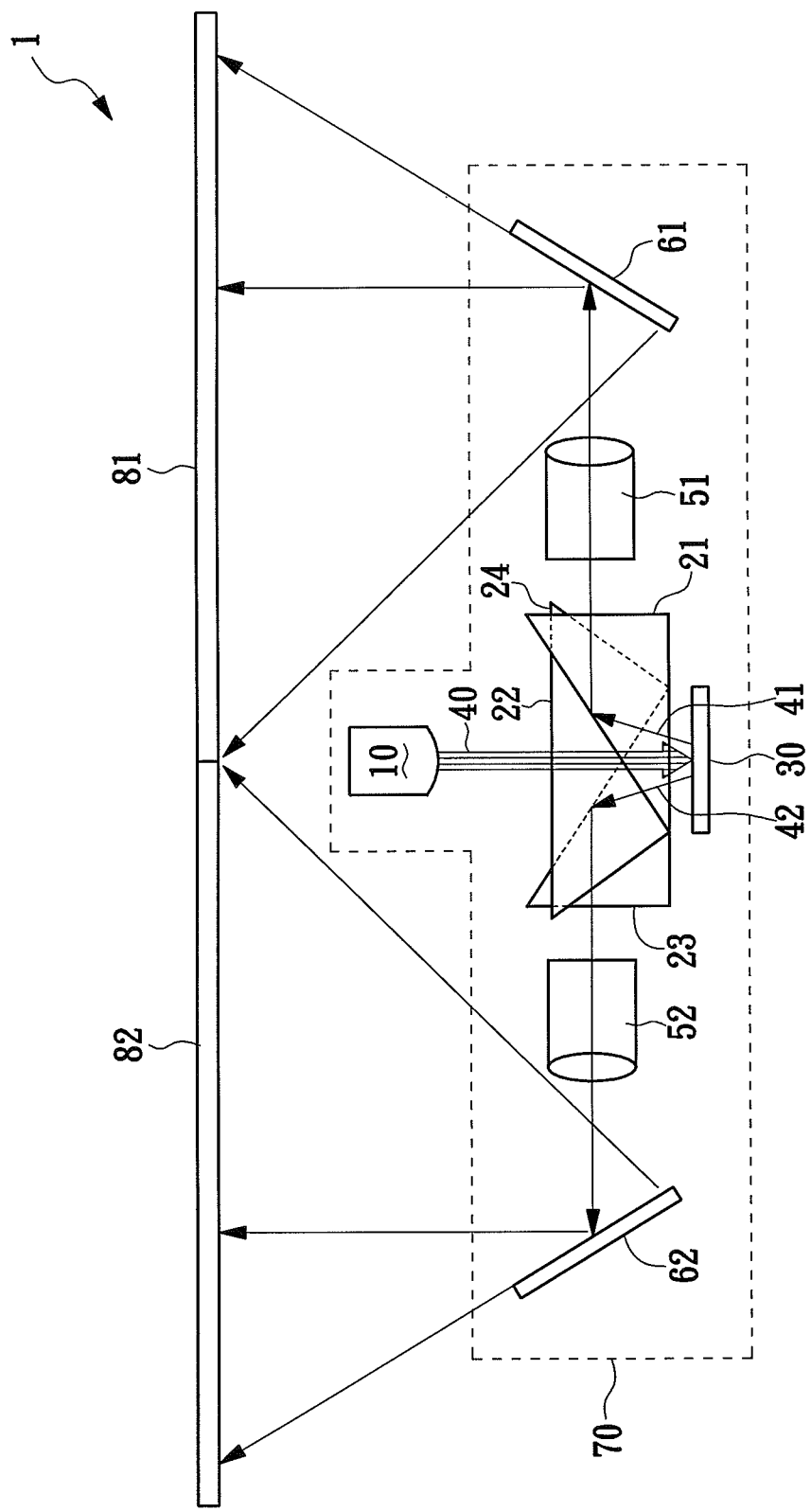
FIG. 1 is a schematic drawing of the first embodiment of the projection apparatus.
Figure 2:
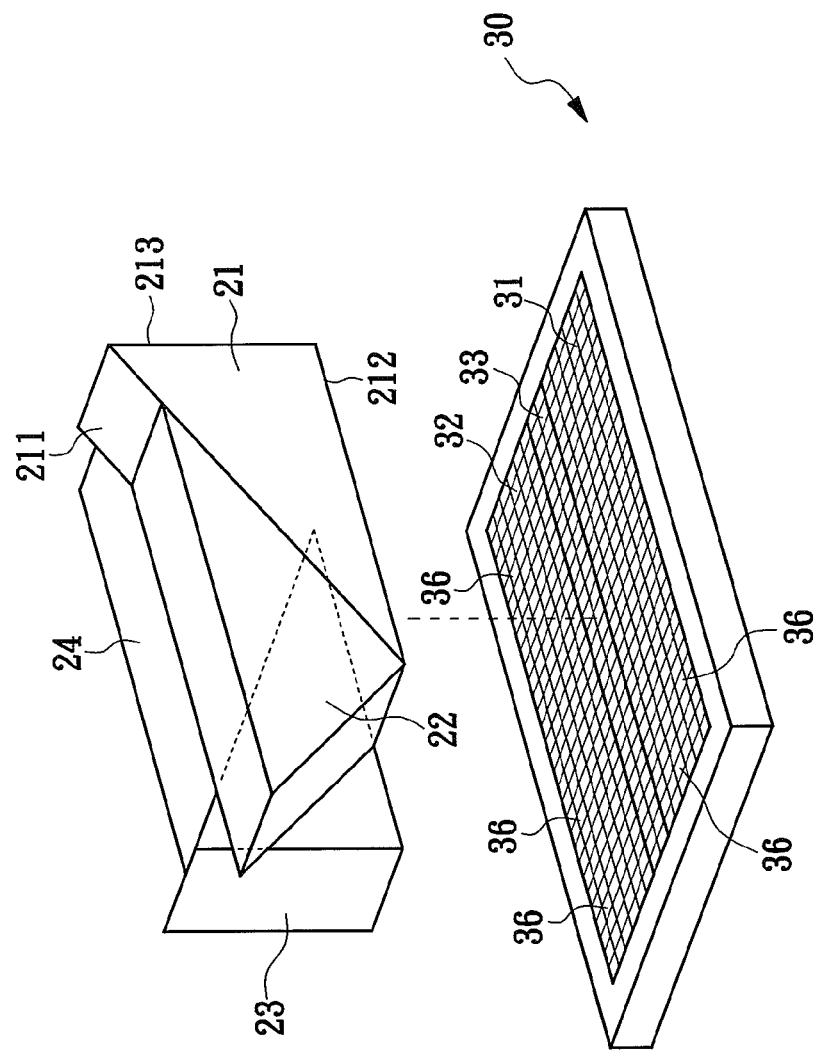
FIG. 2 is an exploded perspective view of the prisms and the light valve device.
Figure 3:
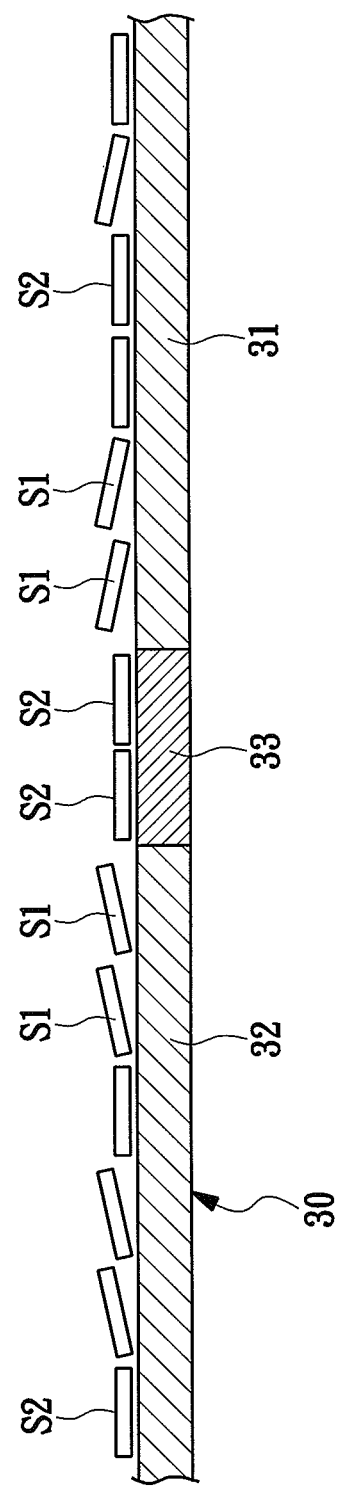
FIG. 3 is a schematic drawing to illustrate the on state and the off state of the light valve units.
Figure 4:
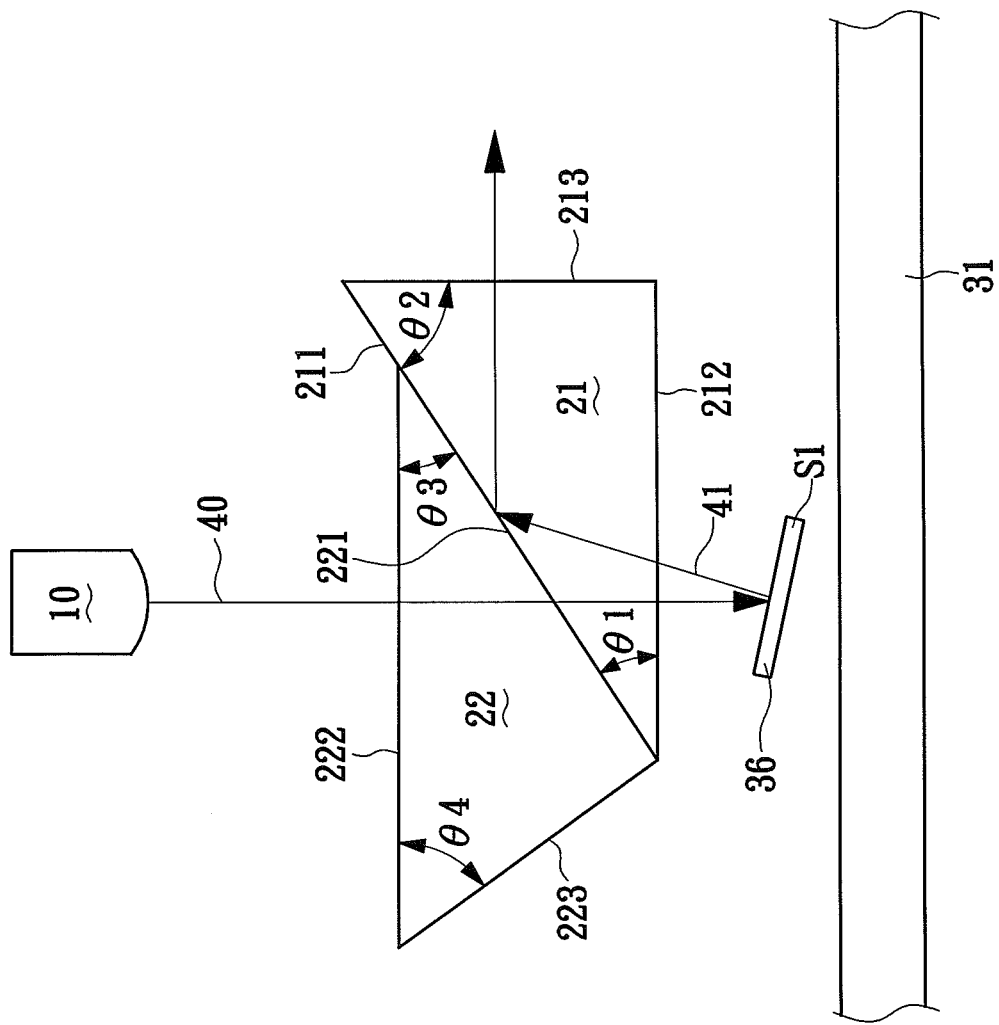
FIG. 4 is a schematic drawing to illustrate the transmission path of the first image beam.
Figure 5:
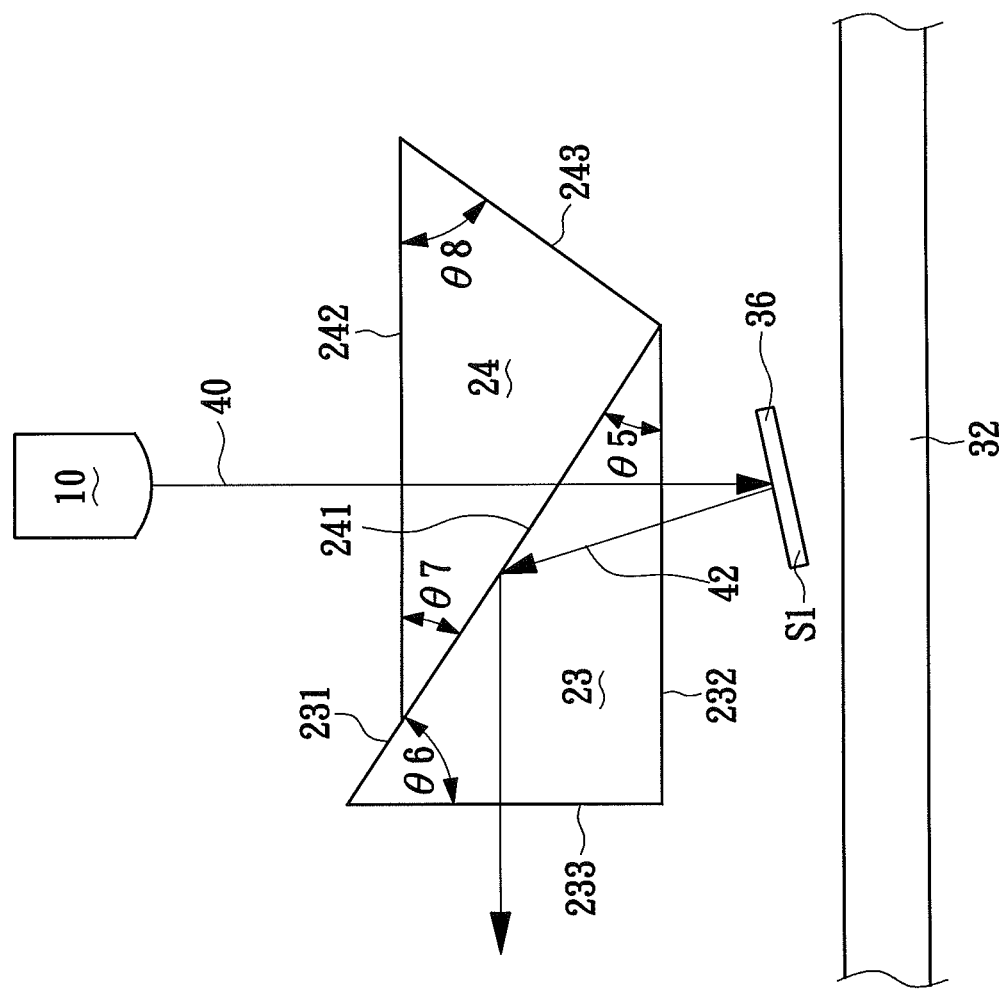
FIG. 5 is a schematic drawing to illustrate the transmission path of the second image beam.

Please refer to FIG. 1 to FIG. 5, which illustrate the first embodiment of the projection apparatus of the present invention. FIG. 1 is a schematic drawing of the first embodiment of the projection apparatus; FIG. 2 is an exploded perspective view of the prisms and the light valve device; FIG. 3 is a schematic drawing to illustrate the on state and the off state of the light valve units; FIG. 4 is a schematic drawing to illustrate the transmission path of the first image beam; FIG. 5 is a schematic drawing to illustrate the transmission path of the second image beam.

As shown in FIG. 1 and FIG. 2, a projection apparatus 1 capable of projecting a first image 81 and a second image 82 comprises a light source module 10, a first prism 21, a second prism 22, a third prism 23, a fourth prism 24, a light valve device 30, a first projection lens 51, and a second projection lens 52, all of which are accommodated within a casing 70.

The light source module 10 provides an illumination beam 40, and in this embodiment, the light source module 10 is an LED module. As shown in FIG. 1 and FIG. 2, the light valve device 30 comprises a plurality of light valve units 36 and is located on a transmission path of the illumination beam 40. In this embodiment, as shown in FIG. 3, the light valve device 30 is divided into a first zone 31, a second zone 32, and a third zone 33. The plurality of light valve units 36 are located the first zone 31, the second zone 32, and the third zone 33.

As shown in FIG. 1 and FIG. 2, the first prism 21 is disposed between the light source module 10 and the light valve device 30 and is located above the first zone 31. The second prism 22 is disposed between the light source module 10 and the light valve device 30 and is located above the first prism 21 and the first zone 31.

As shown in FIG. 1 and FIG. 2, the third prism 23 is disposed between the light source module 10 and the light valve device 30 and is located above the second zone 32. The fourth prism 24 is disposed between the light source module 10 and the light valve device 30 and is located above the third prism 23 and the second zone 32.

In this embodiment, as shown in FIG. 1 to FIG. 3, the light valve device 30 is a Digital Micro-mirror Device (DMD™, Texas™ Instruments, Inc.'s DMD™), and the plurality of light valve units 36 are a plurality of micro mirrors. All of the light valve units 36 can be set to an on state or an off state according to a tilting angle of each light valve unit 36. The light valve units 36 of light valve device 30 are employed for reflecting and converting the illumination beam 40 into a first image beam 41 and a second image beam 42. As shown in FIG. 1, the first projection lens 51 is located on the transmission path of the first image beam 41. The second projection lens 52 is located on the transmission path of the second image beam 42.

As shown in FIG. 3, the on state S1 for the light valve units 36 located in the first zone 31 is the state of the light valve units 36 being tilted to +12 degrees (according to Texas™ DMD™ guide); i.e., the on state angle in the first zone 31 is +12 degrees, and others remain in the off state S2. As shown in FIG. 3, the on state S1 for the light valve units 36 located in the second zone 32 is the state of the light valve units 36 being tilted to −12 degrees (according to Texas™ DMD™ guide); i.e., the on state angle in the second zone 32 is −12 degrees, and others remain in the off state S2. The third zone 33 is disposed between the first zone 31 and the second zone 32, and all the light valve units 36 located in the third zone 33 are set in the off state S2. In summary, the tilting angle for activating the light valve unit 36 located in the first zone 31 to an on state is reversed to the tilting angle for activating the light valve unit 36 located in the second zone 32.

As shown in FIG. 1 and FIG. 4, the transmission path of the illumination beam 40 incident to the first zone 31 of the light valve device 30 is thus: The illumination beam 40 enters the second prism 22, the first prism 21, and the first zone 31, and then the on state light valve units 36 in the first zone 31 reflect and convert the illumination beam 40 into a first image beam 41. After that, the first image beam 41 enters the first prism 21, and the first prism 21 totally reflects the first image beam 41 to the first projection lens 51 for allowing the first projection lens 51 to project the first image beam 41 to form the first image 81 (as shown in FIG. 1).

As shown in FIG. 1 and FIG. 5, the transmission path of the illumination beam 40 incident to the second zone 32 of the light valve device 30 is thus: The illumination beam 40 enters the fourth prism 24, the third prism 23, and the second zone 32, and then the on state light valve units 36 in the second zone 32 reflect and convert the illumination beam 40 into a second image beam 42. After that, the second image beam 42 enters the third prism 23, and the third prism 23 totally reflects the second image beam 42 to the second projection lens 52 for allowing the second projection lens 52 to project the second image beam 42 to form the second image 82 (as shown in FIG. 1).

Please refer to FIG. 4, the first prism 21 comprises a first surface 211, a second surface 212, and a third surface 213, wherein the second surface 212 is disposed above the first zone 31. It is noted that, the second surface 212 is parallel to the first zone 31 in this embodiment, but the present invention is not limited to this embodiment. The second prism 22 comprises a fourth surface 221, a fifth surface 222, and a sixth surface 223, wherein the fourth surface 221 connects to the first surface 211.

As shown in FIG. 4, the transmission path of the illumination beam 40 incident to the first zone 31 of the light valve device 30 is thus: The illumination beam 40 enters the fifth surface 222, the fourth surface 221, the first surface 211, and the second surface 212. The light valve units 36 in the on state S1 in the first zone 31 reflect and convert the illumination beam 40 into the first image beam 41. The first image beam 41 enters the second surface 212 and is totally reflected by the first surface 211 and then outputted to the first projection lens 51 (shown in FIG. 1) via the third surface 213.

It is noted that, in this embodiment, as shown in FIG. 4, the illumination beam 40 passes the second surface 212, the second surface 212, and the first zone 31 at a normal angle; however, the incident angle of the illumination beam 40 is not limited to this condition. Furthermore, the second surface 212 is parallel to the fifth surface 222, and an index of refraction of the second prism 22 and the index of refraction of the first prism 21 are the same in this embodiment in order to ensure that no refraction occurs in either the first prism 21 or the second prism 22 before the illumination beam 40 enters the first zone 31, but the present invention is not limited to this condition.

As shown in FIG. 4, a first angle $\theta_1$ is formed by the first surface 211 and the second surface 212; a second angle $\theta_2$ is formed by the first surface 211 and the third surface 213; a third angle $\theta_3$ is formed by the fourth surface 221 and the fifth surface 222; a fourth angle $\theta_4$ is fawned by the fifth surface 222 and the sixth surface 223. It is noted that, $30° \leq$ the first angle $\theta_1 \leq 60°$; $30° \leq$ the second angle $\theta_2 \leq 60°$; $30° \leq$ the third angle $\theta_3 \leq 60°$; $30° \leq$ the fourth angle $\theta_4 \leq 60°$. In addition, in this embodiment, the first angle $\theta_1$ is equal to the third angle $\theta_3$ because the second surface 212 is parallel to the fifth surface 222; however, the present invention is not limited to this embodiment. There is no particular relation between the first angle $\theta_1$, the second angle $\theta_2$, the third angle $\theta_3$, and the fourth angle $\theta_4$.

As shown in FIG. 5, the third prism 23 comprises a seventh surface 231, an eighth surface 232, and a ninth surface 233, wherein the eighth surface 232 is disposed above the second zone 32. It is noted that, the eighth surface 232 is parallel to the second zone 32 in this embodiment, but the present invention is not limited to that. The fourth prism 24 comprises a tenth surface 241, an eleventh surface 242, and a twelfth surface 243, wherein the tenth surface 241 connects to the seventh surface 231.

As shown in FIG. 5, the transmission path of the illumination beam 40 incident to the second zone 32 of the light valve device 30 is thus: The illumination beam 40 enters the eleventh surface 242, the tenth surface 241, the seventh surface 231, and the eighth surface 232. The light valve units 36 in the on state S1 in the second zone 32 reflect and convert the second image beam 42 into the second image beam 42. The second image beam 42 enters the eighth surface 232 and is totally reflected by the seventh surface 231 and is then outputted to the second projection lens 52 via the ninth surface 233 (shown in FIG. 1).

It is noted that, in this embodiment, as shown in FIG. 5, the illumination beam 40 passes the eighth surface 232, the eleventh surface 242, and the second zone 32 at a normal angle; however, the incident angle of the illumination beam 40 is not limited to this condition. Furthermore, the eighth surface 232 is parallel to the eleventh surface 242, and the index of refraction of the third prism 23 and the index of refraction of the fourth prism 24 are the same in this embodiment in order to ensure that no refraction occurs in either the third prism 24 or the fourth prism 24 before the illumination beam 40 enters the second zone 32, but the present invention is not limited to this condition.

As shown in FIG. 5, a fifth angle $\theta_5$ is formed by the seventh surface 231 and the eighth surface 232; a sixth angle $\theta_6$ is formed by the seventh surface 231 and the ninth surface 233; a seventh angle $\theta_7$ is formed by the tenth surface 241 and the eleventh surface 242; an eighth angle $\theta_8$ is formed by the eleventh surface 242 and the twelfth surface 243. It is noted that $30° \leq$ the fifth angle $\theta_5$ is $\leq 60°$; $30° \leq$ the sixth angle $\theta_6 \leq 60°$; $30° \leq$ the seventh angle $\theta_7 \leq 60°$; $30° \leq$ the eighth angle $\theta_8 \leq 60°$. In addition, in this embodiment, the fifth angle $\theta_5$ is equal to the seventh angle $\theta_7$ because the eighth surface 232 is parallel to the eleventh surface 242; however, the present invention is not limited to this embodiment. There is no particular relation between the fifth angle $\theta_5$, the sixth angle $\theta_6$, the seventh angle $\theta_7$, and the eighth angle $\theta_8$.

It is noted that, please refer back to FIG. 1, the first embodiment of the projection apparatus 1 further comprises a first reflecting mirror 61 and a second reflecting mirror 62. The first reflecting mirror 61 projects the first image beam 41 to form the first image 81 after the first image beam 41 passes through the first projection lens 51. The second reflecting mirror 62 projects the second image beam 42 to form the second image 82 after the second image beam 42 passes through the second projection lens 52. In this embodiment, the first projection lens 51 and the second projection lens 52 are identical, and the back focal lengths of the projection lens 51 and the projection lens 52 are the same.

Figure 6:
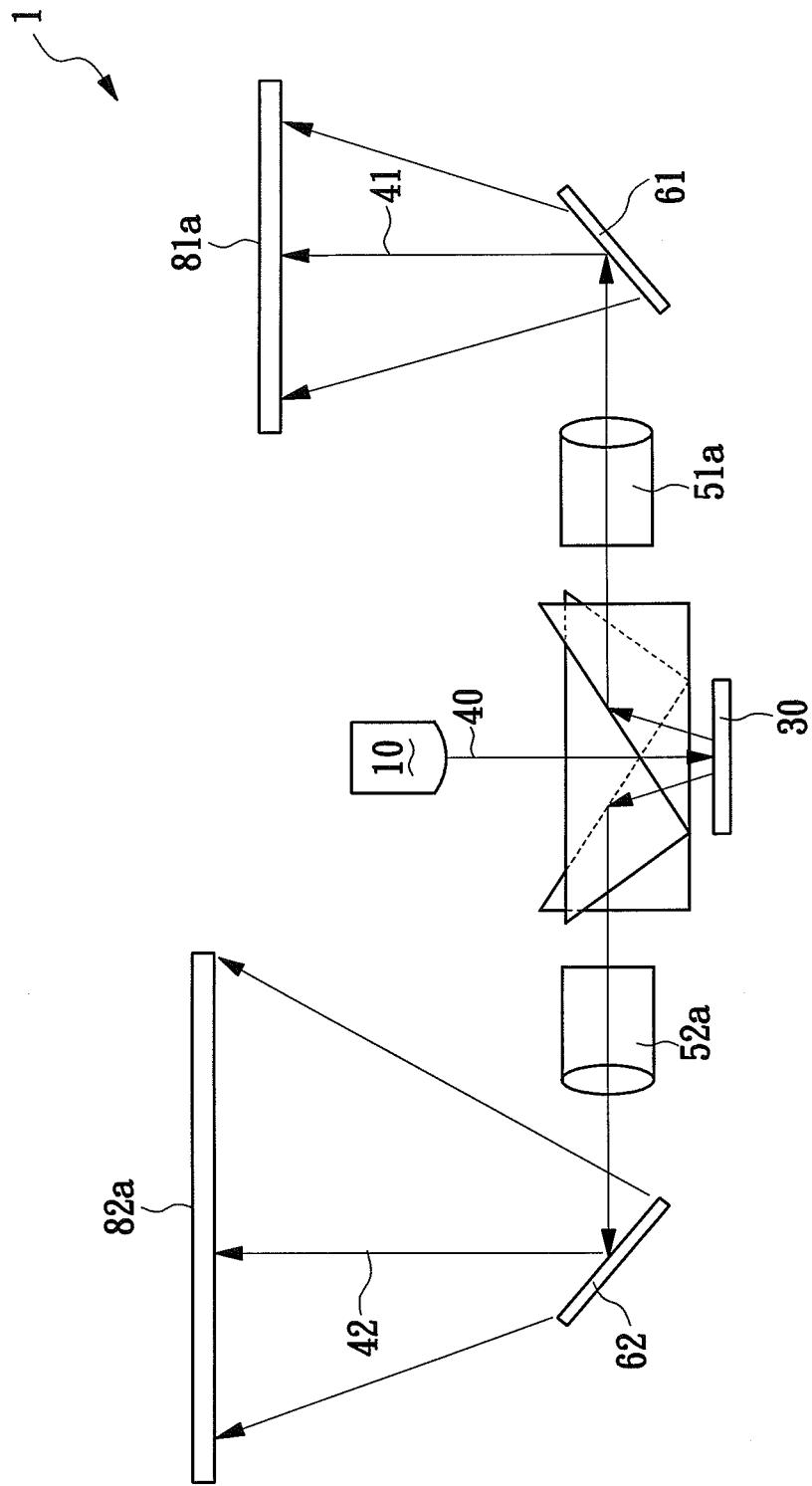
FIG. 6 is a schematic drawing of the second embodiment of the projection apparatus.

Please refer to FIG. 6, which is a schematic drawing of the second embodiment of the projection apparatus.

In the second embodiment of the projection apparatus 1, as shown in FIG. 6, the first image 81a and a second image 82a can be projected over different throw ratio of the first projection lens 51a and the second projection lens 52a.

Figure 7:
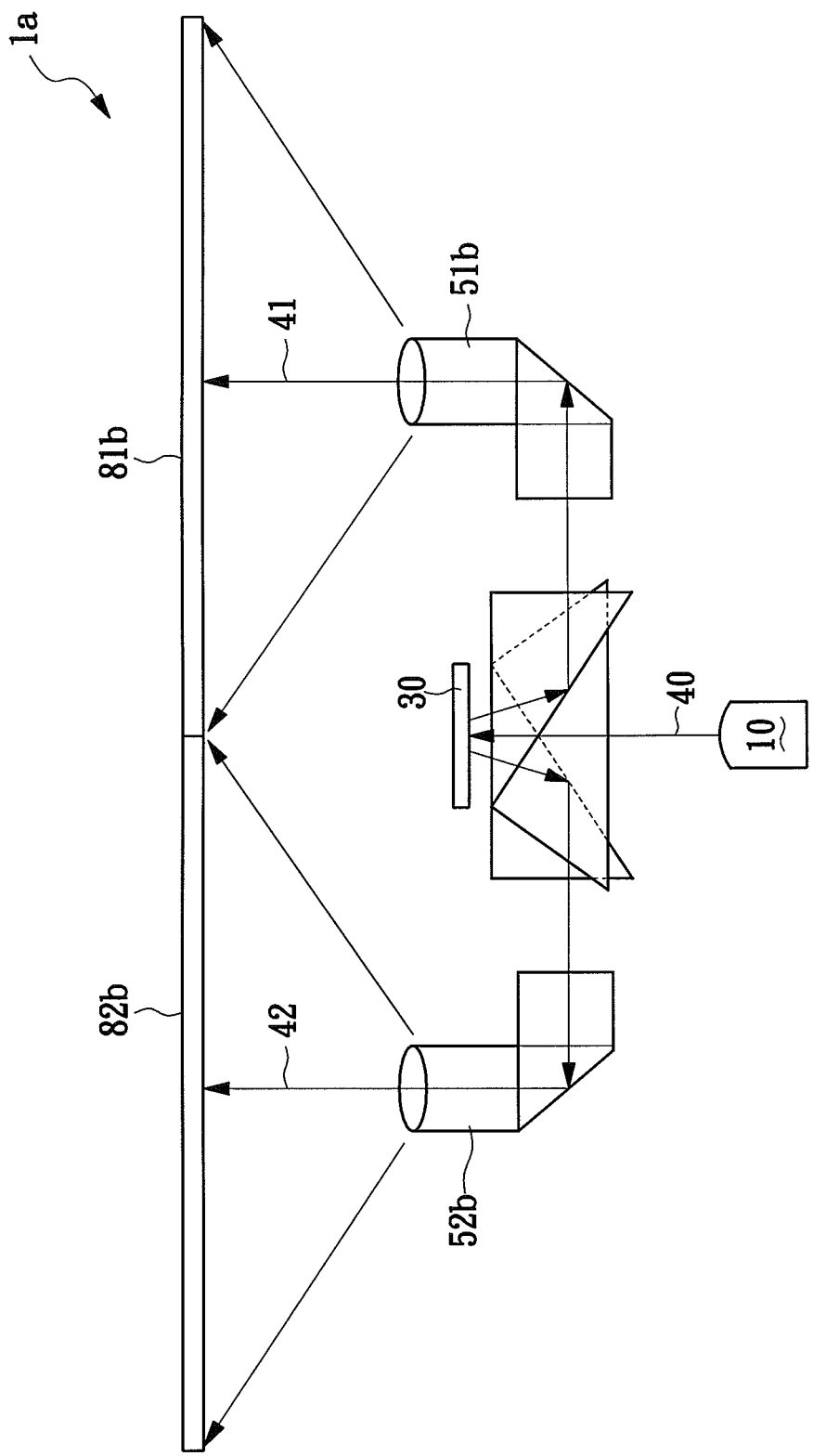
FIG. 7 is a schematic drawing of the third embodiment of the projection apparatus.

Please refer to FIG. 7, which is a schematic drawing of the third embodiment of the projection apparatus.

As shown in FIG. 7, the distinguishable difference in the projection apparatus 1a is that the first projection lens 51b and the second projection lens 52b both are L-shaped lenses with built-in reflecting mirrors to replace the first reflecting mirror 61 and the second reflecting mirror 62 of the first embodiment of the projection apparatus 1.

It must be noted that the above-mentioned embodiments are only for illustration purposes. It is intended that the present invention cover modifications and variations of this invention provided that they fall within the scope of the following claims and their equivalents. Therefore, it will be apparent to those skilled in the art that various modifications and variations can be made to the structure of the present invention without departing from the scope or spirit of the invention.

What is claimed is:

1. A projection apparatus, comprising:
   a light source module for providing an illumination light beam;
   a light valve device located on a transmission path of the illumination light beam and having at least a first zone and a second zone;
   a first interface, a first part of the illumination light beam passing through the first interface to reach the first zone of the light valve device and being reflected by the first zone to form a first image beam, and the first image beam being reflected by the first interface to propagate in a first direction, wherein the light source module and the light valve device are disposed on two opposite sides of the first interface;
   a second interface, a second part of the illumination light beam passing through the second interface to reach the second zone of the light valve device and being reflected by the second zone to form a second image beam, and the second image beam being reflected by the second interface to propagate in a second direction, wherein the light source module and the light valve device are disposed on two opposite sides of the second interface, the first interface and the second interface together are defined by multiple prisms, the second direction is different to the first direction, and the second interface is not parallel to the first interface;
   a first projection lens for receiving the first image beam reflected by the first interface and propagating in the first direction to form a first image; and
   a second projection lens for receiving the second image beam reflected by the second interface and propagating in the second direction to form a second image.

2. The projection apparatus as claimed in claim 1, wherein the first direction is opposite the second direction.

3. The projection apparatus as claimed in claim 1, wherein first direction and the second direction are parallel to the light valve device.

4. The projection apparatus as claimed in claim 1, wherein the first interface is defined by a first prism and a second prism, the second interface is defined by a third prism and a forth prism, the first prism is substantially disposed between the second prism and the first zone, and the third prism is substantially disposed between the forth prism and the second zone.

5. The projection apparatus as claimed in claim 4, wherein the first part of the illumination light beam passes through the second prism and the first prism in succession before reaching the first zone, and the second part of the illumination light beam passes through the fourth prism and the third prism in succession before reaching the second zone.

6. The projection apparatus as claimed in claim 4, wherein the first image beam reflected by the first zone travels through the first prism, and the second image beam reflected by the second zone travels through the third prism.

7. The projection apparatus as claimed in claim 4, wherein an index of refraction of the second prism is the same as an index of refraction of the first prism, and an index of refraction of the fourth prism is the same as an index of refraction of the third prism.

8. The projection apparatus as claimed in claim 4, wherein the first prism comprises a first surface, a second surface and a third surface, the second surface is disposed near the first zone, the first image beam leaves the first prism by the third surface, the second prism comprises a fourth surface, a fifth surface and a sixth surface, the fourth surface is connected to the first surface, the third prism comprises a seventh surface, an eighth surface and a ninth surface, the eighth surface is disposed near the second zone, the second image beam leaves the third prism by the ninth surface, the fourth prism comprises a tenth surface, an eleventh surface and a twelfth surface, and the tenth surface is connected to the seventh surface.

9. The projection apparatus as claimed in claim 8, wherein the third surface and the ninth surface are substantially perpendicular to the light valve device.

10. The projection apparatus as claimed in claim 8, wherein each of the second surface, the fifth surface, the eighth surface and the eleventh surface is substantially parallel to the light valve device.

11. The projection apparatus as claimed in claim 8, wherein a first angle is formed by the first surface and the second surface, a second angle is formed by the first surface and the third surface, a third angle is formed by the fourth surface and the fifth surface, a fourth angle is formed by the fifth surface and the sixth surface, and each of the first angle, the second angle, the third angle and the fourth angle is no less than 30 degrees and no more than 60 degrees.

12. The projection apparatus as claimed in claim 11, wherein a fifth angle is formed by the seventh surface and the eighth surface, a sixth angle is formed by the seventh surface and the ninth surface, a seventh angle is formed by the tenth surface and the eleventh surface, an eighth angle is formed by the eleventh surface and the twelfth surface, and each of the fifth angle, the sixth angle, the seventh angle and the eighth angle is no less than 30 degrees and no more than 60 degrees.

13. The projection apparatus as claimed in claim 1, wherein the first zone is spread with multiple first light valve units, the second zone is spread with multiple second light valve units, each of the light valve units switches between an on state and an off state, and the first light valve units and the second light valve units tilt at different angles in the on state.

14. The projection apparatus as claimed in claim 13, wherein the light valve device further comprise a third zone disposed between the first zone and the second zone, and the third zone is spread with multiple third light valve units set in an off state.

15. The projection apparatus as claimed in claim 1, wherein the first projection lens and the second projection lens have different throw ratios.

16. The projection apparatus as claimed in claim 1, wherein each of the first projection lens and the second projection lens has an L-shape and comprises a reflecting mirror.

17. The projection apparatus as claimed in claim 1, further comprising:
    a first reflecting mirror for deflecting the first image beam passing through the first projection lens to locate the first image in a first region; and
    a second reflecting mirror for deflecting the second image beam passing through the second projection lens to locate the second image in a second region.

18. The projection apparatus as claimed in claim 17, wherein the first region and the second region are substantial in the same plane.

19. A projection apparatus, comprising:
    a light source module for providing an illumination light beam;
    a light valve device located on a transmission path of the illumination light beam and having at least a first zone and a second zone;

a first prism interface, a first part of the illumination light beam passing through the first prism interface to reach the first zone of the light valve device and being reflected by the first zone to form a first image beam, and the first image beam being reflected by the first prism interface to propagate in a first direction, wherein the light source module and the light valve device are disposed on two opposite sides of the first prism interface;

a second prism interface, a second part of the illumination light beam passing through the second prism interface to reach the second zone of the light valve device and being reflected by the second zone to form a second image beam, and the second image beam being reflected by the second prism interface to propagate in a second direction, wherein the light source module and the light valve device are disposed on two opposite sides of the second prism interface, the second direction is different to the first direction, and the second prism interface is not parallel to the first prism interface;

a first projection lens for receiving the first image beam to form a first image; and a second projection lens for receiving the second image beam to form a second image.

* * * * *